United States Patent
Kim et al.

(10) Patent No.: US 12,092,622 B2
(45) Date of Patent: Sep. 17, 2024

(54) METHOD FOR ANALYZING DEUTERATED BENZENES, METHOD FOR SELECTING DEUTERATED BENZENE FOR DEUTERATED COMPOUND PREPARATION, AND METHOD FOR PREPARING DEUTERATED COMPOUND

(71) Applicant: LG Chem, Ltd., Seoul (KR)

(72) Inventors: Sehoon Kim, Daejeon (KR); Kiho Seo, Daejeon (KR); Byoung Hyoun Kim, Daejeon (KR); Su Youn Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 201 days.

(21) Appl. No.: 17/802,370

(22) PCT Filed: Aug. 3, 2021

(86) PCT No.: PCT/KR2021/010128
§ 371 (c)(1),
(2) Date: Aug. 25, 2022

(87) PCT Pub. No.: WO2022/030941
PCT Pub. Date: Feb. 10, 2022

(65) Prior Publication Data
US 2023/0184727 A1    Jun. 15, 2023

(30) Foreign Application Priority Data
Aug. 5, 2020 (KR) .................... 10-2020-0098114

(51) Int. Cl.
*G01N 30/88* (2006.01)
*C07B 59/00* (2006.01)
(Continued)

(52) U.S. Cl.
CPC .......... *G01N 30/88* (2013.01); *C07B 59/001* (2013.01); *G01N 30/7206* (2013.01);
(Continued)

(58) Field of Classification Search
None
See application file for complete search history.

(56) References Cited

U.S. PATENT DOCUMENTS

| 5,401,664 A | 3/1995 | Larson et al. |
| 2006/0163161 A1 | 7/2006 | Biermans et al. |

(Continued)

FOREIGN PATENT DOCUMENTS

| CN | 109725083 A | 5/2019 |
| JP | H07146284 A | 6/1995 |

(Continued)

OTHER PUBLICATIONS

Gruber, C., et al., "An Algorithm for the Deconvolution of Mass Spectrosopic Patterns in Isotope Labeling Studies. Evaluation for the Hydrogen-Deuterium Exchange Reaction in Ketones", The Journal of Organic Chemistry (Jun. 2007) 72 (15), pp. 5778-5783.

(Continued)

*Primary Examiner* — Tam M Nguyen
(74) *Attorney, Agent, or Firm* — Lerner David LLP

(57) ABSTRACT

The present specification relates to a method for analyzing deuterated benzene by gas chromatography, and preparing a deuterated compound using deuterated benzene selected based on the analyzed data.

8 Claims, 2 Drawing Sheets

(51) Int. Cl.
  *G01N 30/72* (2006.01)
  *G01N 30/86* (2006.01)

(52) U.S. Cl.
  CPC ..... *G01N 30/8631* (2013.01); *G01N 30/8679* (2013.01); *C07B 2200/05* (2013.01); *G01N 2030/8854* (2013.01); *G01N 2030/8868* (2013.01)

(56) References Cited

U.S. PATENT DOCUMENTS

| | | | |
|---|---|---|---|
| 2009/0234121 A1* | 9/2009 | Periana | C07B 33/00 568/802 |
| 2013/0071867 A1 | 3/2013 | Fadgen | |
| 2015/0024510 A1 | 1/2015 | Stevens | |
| 2017/0297971 A1 | 10/2017 | Lim et al. | |
| 2021/0080433 A1 | 3/2021 | Jegal et al. | |
| 2023/0217810 A1* | 7/2023 | Nam | H10K 85/6572 257/40 |

FOREIGN PATENT DOCUMENTS

| | | | |
|---|---|---|---|
| JP | 2006023137 | A | 1/2006 |
| JP | 2006250920 | A | 9/2006 |
| JP | 2007205745 | A | 8/2007 |
| JP | 2013501218 | A | 1/2013 |
| JP | 2018505382 | A | 2/2018 |
| KR | 20170025869 | A | 3/2017 |
| KR | 20200041270 | A | 4/2020 |

OTHER PUBLICATIONS

International Search Report for PCT/KR2021/010128 dated Dec. 7, 2021. 4 pgs.

* cited by examiner

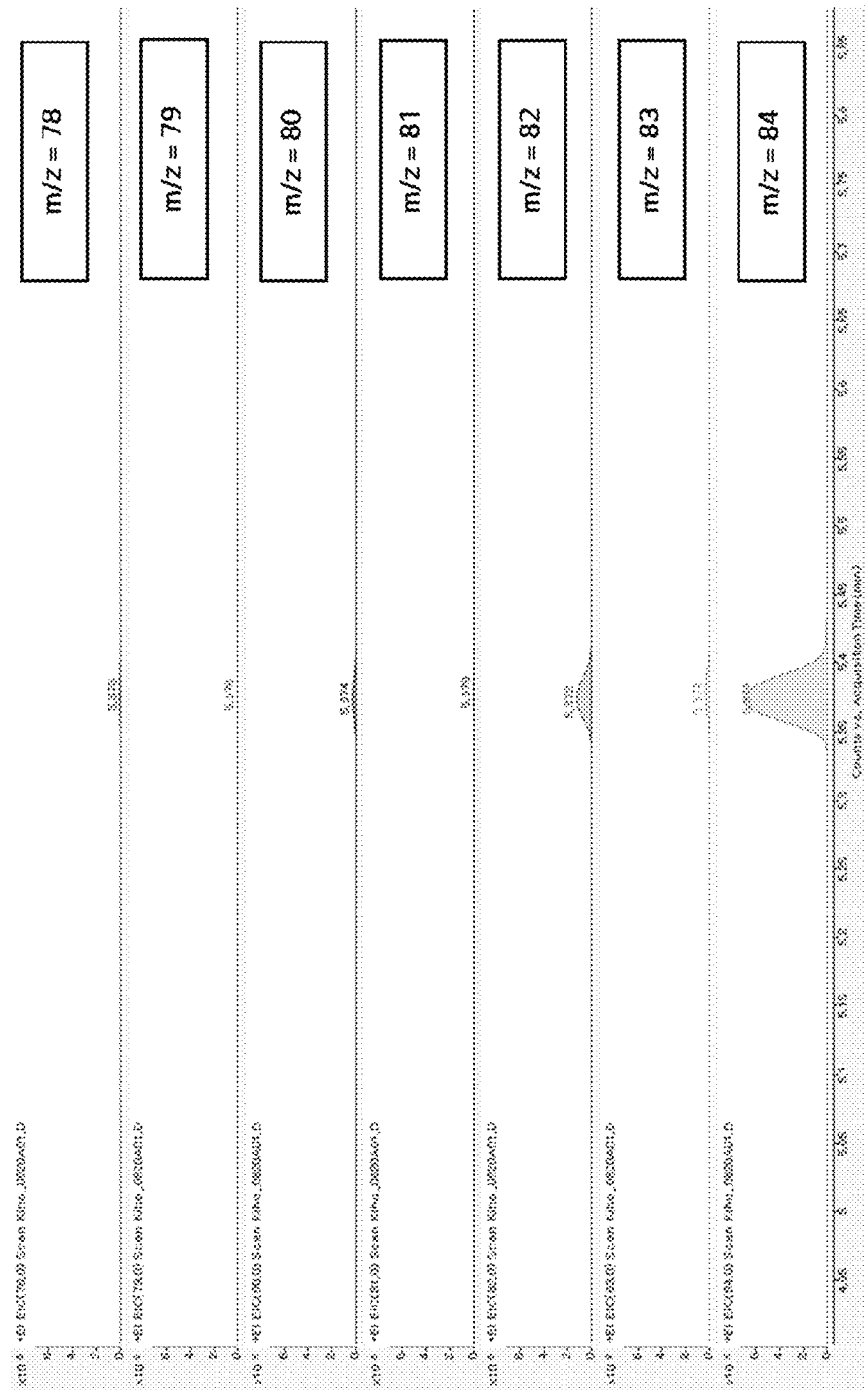
[FIG. 1]

[FIG. 2]
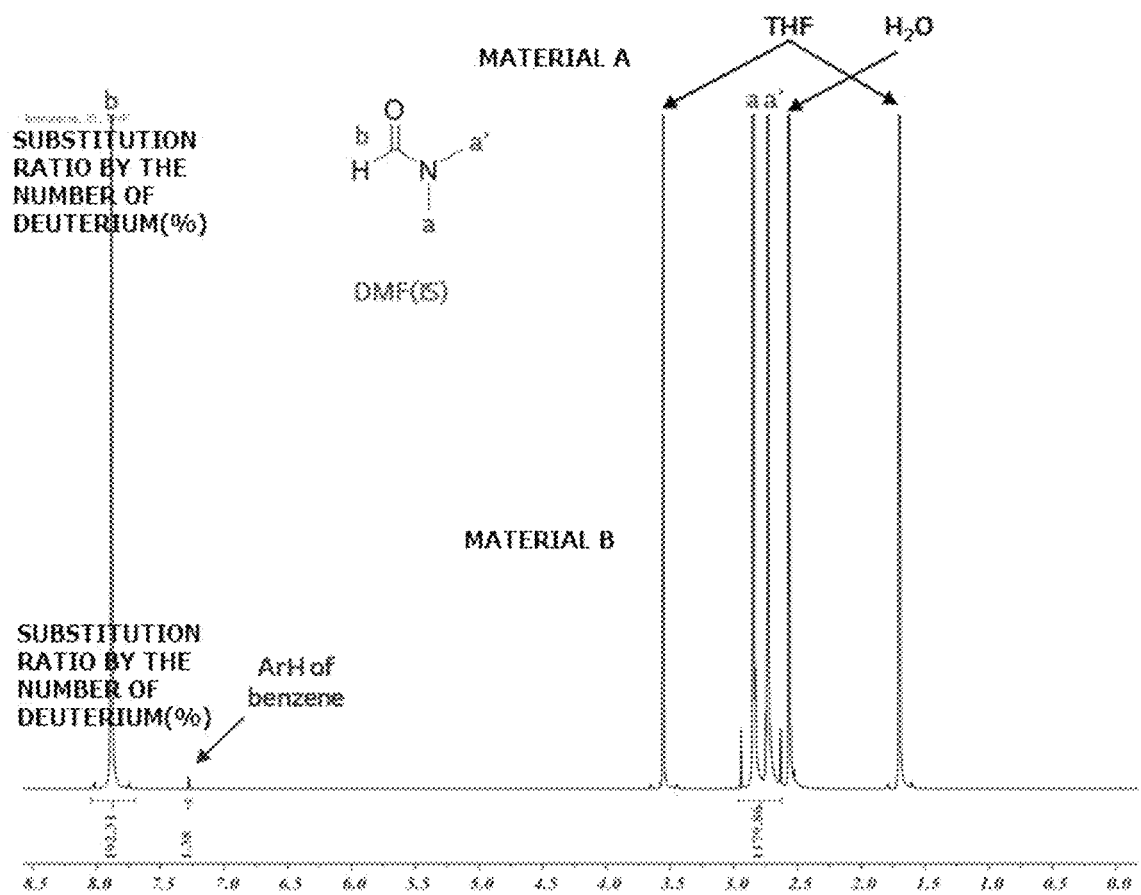

METHOD FOR ANALYZING DEUTERATED BENZENES, METHOD FOR SELECTING DEUTERATED BENZENE FOR DEUTERATED COMPOUND PREPARATION, AND METHOD FOR PREPARING DEUTERATED COMPOUND

CROSS-REFERENCE TO RELATED APPLICATION (S)

The present application is a national stage entry under 35 U.S.C. § 371 of International Application No. PCT/KR2021/010128 filed on Aug. 3, 2021, which claims priority from Korean Patent Application No. 10-2020-0098114 filed on Aug. 5, 2020, all the disclosures of which are incorporated herein by reference.

TECHNICAL FIELD

The present specification relates to a method for analyzing deuterated benzene, a method for selecting deuterated benzene for preparing a deuterated compound, and a method for preparing a deuterated compound.

BACKGROUND ART

Compounds including deuterium are used for various purposes. For example, compounds including deuterium are widely used for drugs, pesticides, organic EL materials and other purposes as well as used as a labeling compound for identifying chemical reaction mechanisms or identifying metabolism.

A method of substituting an aromatic compound with deuterium to enhance a lifetime of an organic light emitting device (OLED) material is known. A principle of such an effect is that lifetime properties of an OLED material are enhanced as a C-D bond becomes to have a lower LUMO energy than a C—H bond.

A deuterated compound prepared through a deuteration reaction is prepared to a composition having two or more isotopes with different molecular weights depending on the number of deuterium substituted, and, since distribution depending on the substitution ratio of deuterium and the number of deuterium affects performance of a device manufactured therewith, controlling depending on the substitution ratio of deuterium and the number of deuterium has been required.

DISCLOSURE

Technical Problem

The present specification is directed to providing a method for analyzing deuterated benzene, a method for selecting deuterated benzene for preparing a deuterated compound, and a method for preparing a deuterated compound.

Technical Solution

One embodiment of the present specification provides a method for analyzing deuterated benzene, the method including (1) separating deuterated benzene by gas chromatography, and then deriving a peak height for each of 78 m/z to 84 m/z of the deuterated benzene based on an individual mass chromatogram of an isotope having a different mass number obtained by a mass analysis;

(2) separating each of a benzene-d0 reference standard, a benzene-d1 reference standard, a benzene-d2 reference standard, a benzene-d3 reference standard, a benzene-d4 reference standard, a benzene-d5 reference standard and a benzene-d6 reference standard by gas chromatography, and then calculating a peak height for each of 78 m/z to 84 m/z of each of the reference standards based on an individual mass chromatogram of an isotope having a different mass number obtained by a mass analysis;

(3) calculating an inverse matrix of a value obtained by normalizing the peak height for each of 78 m/z to 84 m/z of each of the reference standards; and (4) calculating a value obtained by deconvoluting the peak height for each of 78 m/z to 84 m/z of the deuterated benzene through the following Equation 1.

Deconvoluted peak height($i$)=$Ki$(benzene-$d0$)×$H$(84$m/z$)+$Ki$(benzene-$d1$)×$H$(83$m/z$)+$Ki$(benzene-$d2$)×$H$(82$m/z$)+$Ki$(benzene-$d3$)×$H$(81$m/z$)+$Ki$(benzene-$d4$)×$H$(80$m/z$)+$Ki$(benzene-$d5$)×$H$(79$m/z$)+$Ki$(benzene-$d6$)×$H$(78$m/z$)        [Equation 1]

In Equation 1, i means 78 m/z, 79 m/z, 80 m/z, 81 m/z, 82 m/z, 83 m/z or 84 m/z, K means an inverse matrix value for each of 78 m/z to 84 m/z of each of the benzene-d0 reference standard, the benzene-d1 reference standard, the benzene-d2 reference standard, the benzene-d3 reference standard, the benzene-d4 reference standard, the benzene-d5 reference standard and the benzene-d6 reference standard calculated in (3), and H means the peak height for each of 78 m/z to 84 m/z of the deuterated benzene derived in (1).

In addition, one embodiment of the present specification provides a method for selecting deuterated benzene for preparing a deuterated compound, the method including analyzing deuterated benzene using the above-described analysis method to calculate a value obtained by deconvoluting a peak height for each of 78 m/z to 84 m/z of the deuterated benzene; and selecting the deuterated benzene when, based on a sum of the values obtained by deconvoluting the peak height for each of 78 m/z to 84 m/z, a percentage of the value obtained by deconvoluting 84 m/z is greater than or equal to a reference value.

In addition, one embodiment of the present specification provides a method for preparing a deuterated compound, the method including analyzing deuterated benzene using the above-described analysis method to calculate a value obtained by deconvoluting a peak height for each of 78 m/z to 84 m/z of the deuterated benzene; selecting the deuterated benzene when, based on a sum of the values obtained by deconvoluting the peak height for each of 78 m/z to 84 m/z, a percentage of the value obtained by deconvoluting 84 m/z is greater than or equal to a reference value; and deuterating an aromatic compound by selecting the selected deuterated benzene as a deuterium source.

Advantageous Effects

According to an analysis method of a first embodiment of the present specification, a deuterium substitution ratio by the number of deuterium can be derived in deuterated benzene.

According to an analysis method of a second embodiment of the present specification, both a deuterium substitution ratio by the number of deuterium and an average deuterium substitution ratio can be derived in deuterated benzene.

According to an analysis method of a third embodiment of the present specification, a deuterated compound exhibiting superior performance when used in a device can be prepared by selecting deuterated benzene based on the analyzed data.

DESCRIPTION OF DRAWINGS

FIG. 1 is an individual ion chromatogram measuring deuterium-substituted benzene by GC/MS.

FIG. 2 is a graph measuring deuterium-substituted benzene by NMR.

MODE FOR DISCLOSURE

Hereinafter, the present specification will be described in detail.

One embodiment of the present specification provides a method for analyzing deuterated benzene, the method including (1) separating deuterated benzene by gas chromatography, and then deriving a peak height for each of 78 m/z to 84 m/z of the deuterated benzene based on an individual mass chromatogram of an isotope having a different mass number obtained by a mass analysis;

(2) separating each of a benzene-d0 reference standard, a benzene-d1 reference standard, a benzene-d2 reference standard, a benzene-d3 reference standard, a benzene-d4 reference standard, a benzene-d5 reference standard and a benzene-d6 reference standard by gas chromatography, and then calculating a peak height for each of 78 m/z to 84 m/z of each of the reference standards based on an individual mass chromatogram of an isotope having a different mass number obtained by a mass analysis;

(3) calculating an inverse matrix of a value obtained by normalizing the peak height for each of 78 m/z to 84 m/z of each of the reference standards; and (4) calculating a value obtained by deconvoluting the peak height for each of 78 m/z to 84 m/z of the deuterated benzene through the following Equation 1.

Deconvoluted peak height($i$)=$Ki$(benzene-$d0$)×$H$(84$m/z$)+$Ki$(benzene-$d1$)×$H$(83$m/z$)+$Ki$(benzene-$d2$)×$H$(82$m/z$)+$Ki$(benzene-$d3$)×$H$(81$m/z$)+$Ki$(benzene-$d4$)×$H$(80$m/z$)+$Ki$(benzene-$d5$)×$H$(79$m/z$)+$Ki$(benzene-$d6$)×$H$(78$m/z$)     [Equation 1]

In Equation 1, i means 78 m/z, 79 m/z, 80 m/z, 81 m/z, 82 m/z, 83 m/z or 84 m/z, K means an inverse matrix value for each of 78 m/z to 84 m/z of each of the benzene-d0 reference standard, the benzene-d1 reference standard, the benzene-d2 reference standard, the benzene-d3 reference standard, the benzene-d4 reference standard, the benzene-d5 reference standard and the benzene-d6 reference standard calculated in the step (3), and H means the peak height for each of 78 m/z to 84 m/z of the deuterated benzene derived in the step (1).

Since a C—D bond becomes to have a lower LUMO energy than a C—H bond, a device using a deuterium-substituted compound has enhanced lifetime properties.

A deuterated compound prepared through a deuteration reaction is prepared to a composition having two or more isotopes with different molecular weights depending on the number of deuterium substituted, and performance of a device using the same varies depending on how the deuterium is substituted in the prepared composition.

It is found that, among deuterated compounds having the same average deuterium substitution ratio, there is a difference in the performance of a device using the same. Furthermore, it is identified that, even with the same average deuterium substitution ratio, there is a difference in the performance of a device using the same depending on a substitution ratio by the number of deuterium.

In addition, it is identified that a substitution ratio by the number of deuterium of a deuterated compound is affected by substitution distribution by the number of deuterium of deuterated benzene, a deuterium source, during a deuteration reaction.

However, through nuclear magnetic resonance, there is a limit in deriving deuterium substitution ratio distribution depending on the number of deuterium substitution of deuterated benzene, a deuterium source.

Accordingly, the present specification provides an analysis method on distribution depending on a substitution ratio by the number of deuterium and the number of deuterium. Specifically, the present specification establishes a method of, using gas chromatography and mass spectrum, detecting a molecular weight depending on the number of deuterium substitution of deuterated benzene that is a deuterium source, and analyzing a substitution ratio by the number of deuterium based on the detected data. Furthermore, deuterated benzene selected based on the analyzed data is used as a deuterium source to obtain a deuterium-substituted compound, and the above-described effects are proved through lifetime evaluation results on the device manufactured using the same.

According to an analysis method of a first embodiment of the present specification, a deuterium substitution ratio by the number of deuterium may be derived in deuterated benzene.

According to an analysis method of a second embodiment of the present specification, both a deuterium substitution ratio by the number of deuterium and an average deuterium substitution ratio may be derived in deuterated benzene.

According to an analysis method of a third embodiment of the present specification, a deuterated compound exhibiting superior performance when used in a device may be prepared by selecting deuterated benzene based on the analyzed data.

The method for analyzing deuterated benzene of the present specification includes (1) separating deuterated benzene by gas chromatography, and then deriving a peak height for each of 78 m/z to 84 m/z of the deuterated benzene based on an individual mass chromatogram of an isotope having a different mass number obtained by a mass analysis.

The step (1) includes separating deuterated benzene by gas chromatography; deriving an individual mass chromatogram of an isotope having a different mass number obtained by a mass analysis; and, based on the individual mass chromatogram, deriving a peak height for each of 78 m/z to 84 m/z of the deuterated benzene.

In order to separate by the gas chromatography, the step (1) may further include preparing a sample including deuterated benzene.

The sample may further include a diluent solvent. The diluent solvent is not particularly limited as long as it is capable of dissolving the deuterated benzene, and may be selected from among diluent solvents used in the art. For example, the diluent solvent may include at least one of acetone, tetrahydrofuran (THF) and acrylonitrile (AN).

In a sample including deuterated benzene in one embodiment of the present specification, the deuterated benzene may have a concentration of greater than or equal to 0.05

µl/ml and less than or equal to 1 µl/ml. This has an advantage of detecting in the form of a peak with high accuracy in a GC/MS quantitative analysis.

The gas chromatography may have an inlet temperature of 150° C. or higher, 160° C. or higher, 170° C. or higher, 180° C. or higher or 190° C. or higher, and 320° C. or lower, 310° C. or lower, 300° C. or lower, 290° C. or lower, 280° C. or lower, 270° C. or lower, 260° C. or lower, 250° C. or lower, 240° C. or lower or 230° C. or lower.

The gas chromatography may have an oven temperature of 50° C. or higher and 320° C. or lower.

The gas chromatography may have an oven starting temperature of 50° C. or higher, 60° C. or higher, 70° C. or higher, 80° C. or higher or 90° C. or higher, and 250° C. or lower, 200° C. or lower, 150° C. or lower, 130° C. or lower or 110° C. or lower, and the starting temperature may be maintained for 1 minute or longer and 5 minutes or shorter. This has an advantage of preventing material components from being thermally decomposed.

The gas chromatography may have an oven final temperature of 100° C. or higher, 110° C. or higher, 120° C. or higher, 130° C. or higher or 140° C. or higher, and 320° C. or lower, 300° C. or lower, 250° C. or lower, 200° C. or lower, 180° C. or lower or 160° C. or lower, and the final temperature may be maintained for 1 minute or longer and 5 minutes or shorter. This has an advantage of separating the solvent and the benzene component.

The gas chromatography may have an oven temperature raising rate of 5° C./minute or greater, 10° C./minute or greater, 15° C./minute or greater or 20° C./minute or greater, and 50° C./minute or less, 40° C./minute or less or 30° C./minute or less. This has an advantage of separating the solvent and the benzene component.

From a total ion chromatogram (TIC) obtained by the mass analysis, an extracted ion chromatogram (EIC), which is a mass spectrum for each isotope having a different mass number, is derived. Specifically, when a total ion chromatogram obtained by the mass analysis distributes from 78 m/z to 84 m/z, an extracted ion chromatograms is derived for each of 78 m/z, 79 m/z, 80 m/z, 81 m/z, 82 m/z, 83 m/z and 84 m/z.

Based on the extracted ion chromatogram, a peak height for each of 78 m/z to 84 m/z of the deuterated benzene is derived.

Based on the deuterated benzene that is a subject of the analysis, isotope molecular weights depending on the number of deuterium substituted are identified, and the identified isotope molecular weights depending on the number of deuterium are matched to the mass number (m/z) of the extracted ion chromatogram. Information of the extracted ion chromatogram of the matched mass number is matched to information depending on the number of deuterium substituted.

Specifically, when deuterated benzene having 6 deuterium has a molecular weight of approximately 84, the height of the extracted ion chromatogram with a mass number of 84 m/z based on the individual mass chromatogram is a value relating to deuterated benzene having 6 deuterium.

The method for analyzing deuterated benzene of the present specification includes (2) separating each of a benzene-d0 reference standard, a benzene-d1 reference standard, a benzene-d2 reference standard, a benzene-d3 reference standard, a benzene-d4 reference standard, a benzene-d5 reference standard and a benzene-d6 reference standard by gas chromatography, and then calculating a peak height for each of 78 m/z to 84 m/z of each of the reference standards based on an individual mass chromatogram of an isotope having a different mass number obtained by a mass analysis.

The step (2) includes, separating a benzene-d0 reference standard by gas chromatography, and then calculating a peak height for each of 78 m/z to 84 m/z of the benzene-d0 reference standard based on an individual mass chromatogram of an isotope having a different mass number obtained by a mass analysis;

separating a benzene-d1 reference standard by gas chromatography, and then calculating a peak height for each of 78 m/z to 84 m/z of the benzene-d1 reference standard based on an individual mass chromatogram of an isotope having a different mass number obtained by a mass analysis;

separating a benzene-d2 reference standard by gas chromatography, and then calculating a peak height for each of 78 m/z to 84 m/z of the benzene-d2 reference standard based on an individual mass chromatogram of an isotope having a different mass number obtained by a mass analysis;

separating a benzene-d3 reference standard by gas chromatography, and then calculating a peak height for each of 78 m/z to 84 m/z of the benzene-d3 reference standard based on an individual mass chromatogram of an isotope having a different mass number obtained by a mass analysis;

separating a benzene-d4 reference standard by gas chromatography, and then calculating a peak height for each of 78 m/z to 84 m/z of the benzene-d4 reference standard based on an individual mass chromatogram of an isotope having a different mass number obtained by a mass analysis;

separating a benzene-d5 reference standard by gas chromatography, and then calculating a peak height for each of 78 m/z to 84 m/z of the benzene-d5 reference standard based on an individual mass chromatogram of an isotope having a different mass number obtained by a mass analysis; and separating a benzene-d6 reference standard by gas chromatography, and then calculating a peak height for each of 78 m/z to 84 m/z of the benzene-d6 reference standard based on an individual mass chromatogram of an isotope having a different mass number obtained by a mass analysis.

The step (2) may further include preparing a standard sample including each of the benzene-d0 reference standard, the benzene-d1 reference standard, the benzene-d2 reference standard, the benzene-d3 reference standard, the benzene-d4 reference standard, the benzene-d5 reference standard and the benzene-d6 reference standard.

The standard sample may further include a diluent solvent. The diluent solvent is not particularly limited as long as it is capable of dissolving each of the reference standards, and may be selected from among diluent solvents used in the art. For example, the diluent solvent may include at least one of acetone, tetrahydrofuran (THF) and acrylonitrile (AN).

The 'reference standard' refers to a material that, when testing chemicals using chemical, physical or biological methods, serves as a standard to ensure accuracy of the test.

In the present specification, the benzene-d0 reference standard means a material that serves as a standard of benzene-d0, and may mean a material having a high benzene-d0 content and considered to form only with benzene-d0 without other isotopes.

The method for analyzing deuterated benzene of the present specification includes (3) calculating an inverse matrix of a value obtained by normalizing the peak height for each of 78 m/z to 84 m/z of each of the reference standards.

Herein, as the normalization, each of the peak heights of 78 m/z to 84 m/z is divided by the value having the highest peak height among the calculated peak heights for 78 m/z to 84 m/z of the corresponding reference standard.

For example, as the normalization, each of the peak heights of 78 m/z to 84 m/z is divided by 79665 of 83 m/z having the highest peak height of the benzene-d5 reference standard as follows.

| # | m/z | $H_n$ = Height | Normalizing method | Normalized height with Ion 83 |
|---|-----|----------------|--------------------|-------------------------------|
| 1 | Ion 84 | 5582 | $H_1/H_2$ | 0.070 |
| 2 | Ion 83 | 79665 | $H_2/H_2$ | 1.000 |
| 3 | Ion 82 | 5604 | $H_3/H_2$ | 0.070 |
| 4 | Ion 81 | 9222 | $H_4/H_2$ | 0.116 |
| 5 | Ion 80 | 1327 | $H_5/H_2$ | 0.017 |
| 6 | Ion 79 | 1590 | $H_6/H_2$ | 0.020 |
| 7 | Ion 78 | 691 | $H_7/H_2$ | 0.009 |

The method for analyzing deuterated benzene of the present specification may include (4) calculating a value obtained by deconvoluting the peak height for each of 78 m/z to 84 m/z of the deuterated benzene through the following Equation 1.

$$\text{Deconvoluted peak height}(i) = Ki(\text{benzene-}d0) \times H(84m/z) + Ki(\text{benzene-}d1) \times H(83m/z) + Ki(\text{benzene-}d2) \times H(82m/z) + Ki(\text{benzene-}d3) \times H(81m/z) + Ki(\text{benzene-}d4) \times H(80m/z) + Ki(\text{benzene-}d5) \times H(79m/z) + Ki(\text{benzene-}d6) \times H(78m/z) \quad \text{[Equation 1]}$$

In Equation 1, i means 78 m/z, 79 m/z, 80 m/z, 81 m/z, 82 m/z, 83 m/z or 84 m/z, K means an inverse matrix value for each of 78 m/z to 84 m/z of each of the benzene-d0 reference standard, the benzene-d1 reference standard, the benzene-d2 reference standard, the benzene-d3 reference standard, the benzene-d4 reference standard, the benzene-d5 reference standard and the benzene-d6 reference standard calculated in the step (3), and H means the peak height for each of 78 m/z to 84 m/z of the deuterated benzene derived in the step (1).

A mass chromatogram obtained by separating the deuterated benzene by gas chromatography is detected as one peak. In order to quantify the peak detected as one peak without being separated from benzene-d0 to benzene-d6 as the m/z value of the detected component, deconvolution is conducted in order to find out the m/z ratio detected from each of d0 to d6.

The method for analyzing deuterated benzene of the present specification may further include (5) calculating a percentage for each of 78 m/z to 84 m/z of the values obtained by deconvoluting the peak height for each of 78 m/z to 84 m/z of the deuterated benzene.

The method for analyzing deuterated benzene of the present specification may further include (6) selecting the deuterated benzene in which a percentage of the value obtained by deconvoluting 84 m/z calculated in (5) is 40% or greater.

The method for analyzing deuterated benzene of the present specification may further include (7) calculating an average deuterium substitution ratio through the following Equation 2.

$$\text{Average deuterium substitution ratio (\%)} = \{A0(78m/z) \times B0(78m/z)) + (A1(79m/z) \times B1(79m/z)) + (A2(80m/z) \times B2(80m/z)) + (A3(81m/z) \times B3(81m/z)) + (A4(82m/z) \times B4(82m/z)) + (A5(83m/z) \times B5(83m/z)) + (A6(84m/z) \times B6(84m/z))\}/6 \quad \text{[Equation 2]}$$

In Equation 2,

A0 to A6 are percentages of the values respectively obtained by deconvoluting 78 m/z, 79 m/z, 80 m/z, 81 m/z, 82 m/z, 83 m/z and 84 m/z, and B0 to B6 are the number of deuterium substitution of the molecule respectively corresponding to 78 m/z, 79 m/z, 80 m/z, 81 m/z, 82 m/z, 83 m/z and 84 m/z.

One embodiment of the present specification provides a method for selecting deuterated benzene for preparing a deuterated compound, the method including analyzing deuterated benzene using the above-described analysis method to calculate a value obtained by deconvoluting a peak height for each of 78 m/z to 84 m/z of the deuterated benzene; and selecting the deuterated benzene when, based on a sum of the values obtained by deconvoluting the peak height for each of 78 m/z to 84 m/z, a percentage of the value obtained by deconvoluting 84 m/z is greater than or equal to a reference value.

The method for selecting deuterated benzene for preparing a deuterated compound may cite the descriptions on the method for analyzing deuterated benzene, and repeated descriptions will not be included.

The reference value may be 40%, 50%, 60%, 65%, 70%, 75%, 80%, 85%, 90% or 95%, and when greater than or equal to the reference value, the corresponding deuterated benzene may be selected.

One embodiment of the present specification provides a method for preparing a deuterated compound, the method including analyzing deuterated benzene using the above-described analysis method to calculate a value obtained by deconvoluting a peak height for each of 78 m/z to 84 m/z of the deuterated benzene; selecting the deuterated benzene when, based on a sum of the values obtained by deconvoluting the peak height for each of 78 m/z to 84 m/z, a percentage of the value obtained by deconvoluting 84 m/z is greater than or equal to a reference value; and deuterating an aromatic compound by selecting the selected deuterated benzene as a deuterium source.

The method for preparing a deuterated compound may cite the descriptions on the method for analyzing deuterated benzene, and repeated descriptions will not be included.

The reference value may be 40%, and when greater than or equal to the reference value, the corresponding deuterated benzene may be selected.

In the present specification, an aromatic compound subject to deuteration is not particularly limited as long as it is a compound capable of being deuterated using the selected deuterated benzene. Specifically, the aromatic compound subject to deuteration may be a substituted or unsubstituted polycyclic hydrocarbon aromatic compound; or a substituted or unsubstituted polycyclic heteroaromatic compound.

In the present specification, the aromatic compound subject to deuteration may be selected from among substituted or unsubstituted naphthalene, substituted or unsubstituted anthracene, substituted or unsubstituted carbazole, substituted or unsubstituted dibenzofuran, substituted or unsubstituted dibenzothiophene and the like.

In the present specification, the aromatic compound subject to deuteration may be substituted or unsubstituted anthracene.

In the present specification, the aromatic compound subject to deuteration may include a compound represented by the following Chemical Formula 1.

[Chemical Formula 1]

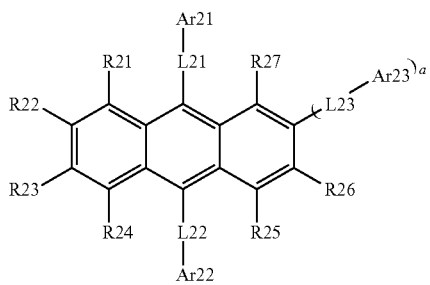

In Chemical Formula 1,

L21 to L23 are the same as or different from each other, and each independently a direct bond; a substituted or unsubstituted arylene group; or a substituted or unsubstituted heteroarylene group, R21 to R27 are the same as or different from each other, and each independently hydrogen; a substituted or unsubstituted alkyl group; a substituted or unsubstituted cycloalkyl group; a substituted or unsubstituted silyl group; a substituted or unsubstituted aryl group; or a substituted or unsubstituted heteroaryl group, Ar21 to Ar23 are the same as or different from each other, and each independently a substituted or unsubstituted aryl group; or a substituted or unsubstituted heteroaryl group, and a is 0 or 1.

In the present specification, examples of substituents are described below, however, the substituents are not limited thereto.

The term "substitution" means a hydrogen atom bonding to a carbon atom of a compound being changed to another substituent, and the position of substitution is not limited as long as it is a position at which the hydrogen atom is substituted, that is, a position at which a substituent is capable of substituting, and when two or more substituents substitute, the two or more substituents may be the same as or different from each other.

In the present specification, the term "substituted or unsubstituted" means being substituted with one, two or more substituents selected from the group consisting of a halogen group; a nitrile group; a nitro group; a hydroxyl group; an amine group; a silyl group; a boron group; an alkoxy group; an alkyl group; a cycloalkyl group; an aryl group; and a heterocyclic group, or being substituted with a substituent linking two or more substituents among the substituents illustrated above, or having no substituents. For example, the "substituent linking two or more substituents" may be a biphenyl group. In other words, a biphenyl group may be an aryl group, or may be interpreted as a substituent linking two phenyl groups.

In the present specification, examples of the halogen group may include fluorine (—F), chlorine (—Cl), bromine (—Br) or iodine (—I).

In the present specification, the silyl group may be represented by a chemical formula of —$SiY_aY_bY_c$, and $Y_a$, $Y_b$ and $Y_c$ may each be hydrogen; a substituted or unsubstituted alkyl group; or a substituted or unsubstituted aryl group. Specific examples of the silyl group may include a trimethylsilyl group, a triethylsilyl group, a tert-butyldimethylsilyl group, a vinyldimethylsilyl group, a propyldimethylsilyl group, a triphenylsilyl group, a diphenylsilyl group, a phenylsilyl group and the like, but are not limited thereto.

In the present specification, the boron group may be represented by a chemical formula of —$BY_dY_e$, and $Y_d$ and $Y_e$ may each be hydrogen; a substituted or unsubstituted alkyl group; or a substituted or unsubstituted aryl group. Specific examples of the boron group may include a trimethylboron group, a triethylboron group, a tert-butyldimethylboron group, a triphenylboron group, a phenylboron group and the like, but are not limited thereto.

In the present specification, the alkyl group may be linear or branched, and although not particularly limited thereto, the number of carbon atoms is preferably from 1 to 60. According to one embodiment, the number of carbon atoms of the alkyl group is from 1 to 30. According to another embodiment, the number of carbon atoms of the alkyl group is from 1 to 20. According to another embodiment, the number of carbon atoms of the alkyl group is from 1 to 10. Specific examples of the alkyl group may include a methyl group, an ethyl group, a propyl group, an n-propyl group, an isopropyl group, a butyl group, an n-butyl group, an isobutyl group, a tert-butyl group, a pentyl group, an n-pentyl group, a hexyl group, an n-hexyl group, a heptyl group, an n-heptyl group, an octyl group, an n-octyl group and the like, but are not limited thereto.

In the present specification, the alkoxy group may be linear, branched or cyclic. The number of carbon atoms of the alkoxy group is not particularly limited, but is preferably from 1 to 20. Specific examples thereof may include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy and the like, but are not limited thereto.

Substituents including the alkyl group, the alkoxy group and other alkyl group parts described in the present specification include all of linear or branched forms.

In the present specification, the cycloalkyl group is not particularly limited, but preferably has 3 to 60 carbon atoms, and according to one embodiment, the number of carbon atoms of the cycloalkyl group is from 3 to 30. According to another embodiment, the number of carbon atoms of the cycloalkyl group is from 3 to 20. According to another embodiment, the number of carbon atoms of the cycloalkyl group is from 3 to 6. Specific examples thereof may include a cyclopropyl group, a cyclobutyl group, a cyclopentyl group, a cyclohexyl group, a cycloheptyl group, a cyclooctyl group and the like, but are not limited thereto.

In the present specification, the aryl group is not particularly limited, but preferably has 6 to 60 carbon atoms, and may be a monocyclic aryl group or a polycyclic aryl group. According to one embodiment, the number of carbon atoms of the aryl group is from 6 to 39. According to one embodiment, the number of carbon atoms of the aryl group is from 6 to 30. When the aryl group is a monocyclic aryl group, examples thereof may include a phenyl group, a biphenyl group, a terphenyl group, a quarterphenyl group and the like, but are not limited thereto. When the aryl group is a polycyclic aryl group, examples thereof may include a naphthyl group, an anthracenyl group, a phenanthryl group, a pyrenyl group, a perylenyl group, a triphenyl group, a chrysenyl group, a fluorenyl group, a triphenylenyl group and the like, but are not limited thereto.

In the present specification, the fluorene group may be substituted, and two substituents may bond to each other to form a spiro structure.

When the fluorene group is substituted, a spirofluorene group such as

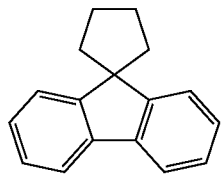 [SMILES: c1ccc2c(c1)-c1ccccc1C21CCCC1]

and

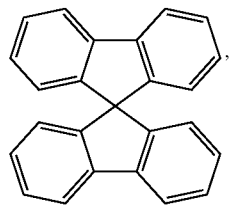 [SMILES: c1ccc2c(c1)-c1ccccc1C21c2ccccc2-c2ccccc21]

a substituted fluorene group such as

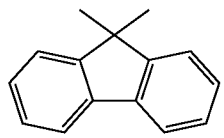

(9,9-dimethylfluorene group) and

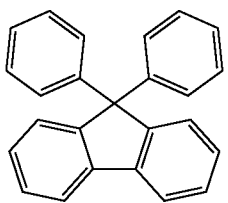 [SMILES: c1ccc(C2(c3ccccc3)c3ccccc3-c3ccccc32)cc1]

(9,9-diphenylfluorene group) may be included, however, the structure is not limited thereto.

In the present specification, the heterocyclic group is a cyclic group including one or more of N, O, P, S, Si and Se as a heteroatom, and although not particularly limited thereto, the number of carbon atoms is preferably from 2 to 60. According to one embodiment, the number of carbon atoms of the heterocyclic group is from 2 to 36. Examples of the heterocyclic group may include a pyridine group, a pyrrole group, a pyrimidine group, a quinoline group, a pyridazine group, a furan group, a thiophene group, an imidazole group, a pyrazole group, a dibenzofuran group, a dibenzothiophene group, a carbazole group, a benzocarbazole group, a benzonaphthofuran group, a benzonaphthothiophene group, an indenocarbazole group, an indolocarbazole group and the like, but are not limited thereto.

In the present specification, the descriptions on the heterocyclic group provided above may be applied to the heteroaryl group except for being aromatic.

In the present specification, the amine group may be selected from the group consisting of —NH$_2$; an alkylamine group; an N-alkylarylamine group; an arylamine group; an N-arylheteroarylamine group; an N-alkylheteroarylamine group and a heteroarylamine group, and although not particularly limited thereto, the number of carbon atoms is preferably from 1 to 30. Specific examples of the amine group may include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, an N-phenylnaphthylamine group, a ditolylamine group, an N-phenyltolylamine group, a triphenylamine group, an N-phenylbiphenylamine group, an N-phenylnaphthylamine group, an N-biphenylnaphthylamine group, an N-naphthylfluorenylamine group, an N-phenylphenanthrenylamine group, an N-biphenylphenanthrenylamine group, an N-phenylfluorenylamine group, an N-phenylterphenylamine group, an N-phenanthrenylfluorenylamine group, an N-biphenylfluorenylamine group and the like, but are not limited thereto.

In the present specification, the N-alkylarylamine group means an amine group in which N of the amine group is substituted with an alkyl group and an aryl group.

In the present specification, the N-arylheteroarylamine group means an amine group in which N of the amine group is substituted with an aryl group and a heteroaryl group.

In the present specification, the N-alkylheteroarylamine group means an amine group in which N of the amine group is substituted with an alkyl group and a heteroaryl group.

In the present specification, the alkyl group, the aryl group and the heteroaryl group in the alkylamine group; the N-alkylarylamine group; the arylamine group; the N-arylheteroarylamine group; the N-alkylheteroarylamine group and the heteroarylamine group are the same as the examples of the alkyl group, the aryl group and the heteroaryl group described above.

In the present specification, the aromatic compound subject to deuteration may be a compound included in a light emitting layer of a device, and may specifically be a host of the light emitting layer.

One embodiment of the present specification provides a method for manufacturing an electronic device, the method including preparing a deuterated compound using the above-described method; and manufacturing an electronic device using the prepared deuterated compound.

The method for manufacturing an electronic device may cite the descriptions on the method for analyzing a deuterated benzene, and repeated descriptions will not be included.

The electronic device is not particularly limited as long as it is a device capable of using a deuterated compound, and examples thereof may include an organic light emitting device, an organic phosphorescent device, and organic solar cell, an organic photo conductor, an organic transistor and the like.

The electronic device includes a first electrode; a second electrode provided opposite to the first electrode; and one or more organic material layers provided between the first electrode and the second electrode, wherein one or more layers of the organic material layers may include the deuterated compound prepared using the above-described method.

When the electronic device is an organic light emitting device, the organic material layer includes a light emitting layer, and the light emitting layer may include the deuterated compound prepared using the above-described method.

When the electronic device is an organic light emitting device, the organic light emitting device may have a structure further including a layer selected from among a hole injection layer, a hole transfer layer, a light emitting layer, an electron transfer layer, an electron injection layer and the like as the organic material layer.

In the present specification, the prepared deuterated compound may also be used in an electronic device including an organic phosphorescent device, an organic solar cell, an organic photo conductor, an organic transistor and the like under a similar principle used in the organic light emitting device. For example, the organic solar cell may have a structure including an anode, a cathode and a photoactive layer provided between the anode and the cathode, wherein the photoactive layer may include the selected deuterated compound.

Hereinafter, the present specification will be described in more detail with reference to examples. However, the following examples are for illustrative purposes only, and not for limiting the present specification.

EXAMPLE

Experimental Example 1

Deuterium-substituted benzene was measured using each of gas chromatography-mass spectrometry (GC-MS) and nuclear magnetic resonance (NMR), and each result is shown in FIG. 1 and FIG. 2.

An analysis sample was prepared using deuterium-substituted benzene to at concentration of 0.2 μl/ml (sample 2 μl+acetone 10 ml) and measured by GC-MS under the following condition, and the results are shown in FIG. 1 and Table 1.

Spill ratio: 50:1
Inlet temperature: 200° C.
Oven temperature: start 100° C. (hold for 3 minutes) and 150° C. (hold for 6.5 minutes). Rate: 20° C./min
Detector 300° C.
Column type: HP-5 (60 m×0.25 mm×1 μm)
Injection volume: 2 μl

TABLE 1

|  | Number of D | | | | | | |
| --- | --- | --- | --- | --- | --- | --- | --- |
|  | 0 | 1 | 2 | 3 | 4 | 5 | 6 |
| Number of H | 6 | 5 | 4 | 3 | 2 | 1 | 0 |
| M (m/z) | 78 | 79 | 80 | 81 | 82 | 83 | 84 |
| Mole % | 0 | 0 | 0.1 | 0 | 0 | 2.5 | 97.4 |
| Average Deuterium Substitution (%) | | | | 99.5 | | | |

An analysis sample was prepared by dissolving deuterium-substituted benzene in tetrahydrofuran-d8 (THF-d8), measured using NMR with 1D normal (H) at 298 K, and the results are shown in FIG. 2 and Table 2.

TABLE 2

| Hydrogen % | Average Deuterium Substitution % |
| --- | --- |
| 0.3 | 99.7 |

As a result, only the relative average substitution ratio was determined by NMR, however, with GC/MS, each isotope content ratio was able to be derived through deconvolution by information on the constant mass fragment.

Experimental Example 2

Isotope reference standards of each of benzene-d0 to benzene-d6 (Sigma-Aldrich, Cambridge isotope laboratories, inc., CDN isotopes) and deuterium-substituted benzene prepared by conducting a deuteration reaction were prepared, and each of the analysis samples was prepared at a concentration of 0.2 μl/ml (sample 2 μl+acetone 10 ml).

GC-MS measurement was conducted under the same condition as in Experimental Example 1, and the results are shown in Table 3 and Table 4.

The following Table 3 shows a normalized peak height for each m/z of each of the isotope reference standards of benzene-d0 to benzene-d6, and the following Table 4 shows a peak height and height % thereof for each m/z of the deuterium-substituted benzene sample prepared by conducting a deuteration reaction.

TABLE 3

| m/z | Benzene-$d_0$ | Benzene-$d_1$ | Benzene-$d_2$ | Benzene-$d_3$ | Benzene-$d_4$ | Benzene-$d_5$ | Benzene-$d_6$ |
| --- | --- | --- | --- | --- | --- | --- | --- |
| 84 | 0.000 | 0.000 | 0.000 | 0.000 | 0.004 | 0.081 | 1.000 |
| 83 | 0.000 | 0.000 | 0.000 | 0.002 | 0.105 | 1.000 | 0.032 |
| 82 | 0.000 | 0.000 | 0.002 | 0.078 | 1.000 | 0.081 | 0.175 |
| 81 | 0.000 | 0.002 | 0.077 | 1.000 | 0.126 | 0.138 | 0.005 |

TABLE 3-continued

| m/z | Benzene-$d_0$ | Benzene-$d_1$ | Benzene-$d_2$ | Benzene-$d_3$ | Benzene-$d_4$ | Benzene-$d_5$ | Benzene-$d_6$ |
|---|---|---|---|---|---|---|---|
| 80 | 0.002 | 0.074 | 1.000 | 0.192 | 0.112 | 0.019 | 0.039 |
| 79 | 0.075 | 1.000 | 0.204 | 0.099 | 0.028 | 0.026 | 0.001 |
| 78 | 1.000 | 0.246 | 0.081 | 0.034 | 0.020 | 0.008 | 0.009 |

A matrix (Multiplier of each mass peak)

TABLE 4

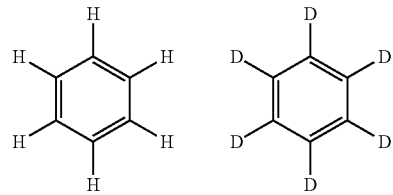

Chemical Formula: $C_6H_6$
Exact Mass: 78.05

Chemical Formula: $C_6D_6$
Exact Mass: 84.08

| | | Height | Height % |
|---|---|---|---|
| D6 | Ion 84 | 6.99E+06 | 77.5% |
| D5 | Ion 83 | 4.01E+05 | 4.4% |
| D4 | Ion 82 | 1.22E+06 | 13.5% |
| D3 | Ion 81 | 5.8SE+04 | 0.7% |
| D2 | Ion 80 | 2.77E+05 | 3.1% |
| D1 | Ion 79 | 1.29E+04 | 0.1% |
| D0 | Ion 78 | 6.78E+04 | 0.8% |

Deconvoluted values were derived using the normalized peak height for each m/z of Table 3, and the peak height for each m/z of the deuterium-substituted benzene sample prepared by conducting a deuteration reaction (Table 4).

When the value of Table 3 is employed as an A matrix and the peak height of Table 4 is employed as a B matrix, the B matrix (hereinafter, referred as B) is a product of the A matrix (hereinafter, referred as A) and the deconvoluted value (hereinafter, referred as X), and therefore, the deconvoluted value is a product of an inverse matrix of A (hereinafter, referred to as $A^{-1}$) and the B matrix.

$$B = A*X \Rightarrow A^{-1}*B = X$$

Therefore, in order to obtain the deconvoluted value, the inverse matrix of A was obtained as in the following Table 5.

TABLE 5

| | $A^{-1}$ | | | | | | |
|---|---|---|---|---|---|---|---|
| m/z | Benzene-$d_0$ | Benzene-$d_1$ | Benzene-$d_2$ | Benzene-$d_3$ | Benzene-$d_4$ | Benzene-$d_5$ | Benzene-$d_6$ |
| 84 | −0.0065 | 0.0010 | −0.0094 | −0.0030 | −0.0317 | −0.2482 | 1.0187 |
| 83 | 0.0070 | −0.0148 | 0.0042 | −0.0615 | −0.1997 | 1.0340 | −0.0772 |
| 82 | −0.0233 | 0.0171 | −0.0917 | −0.1832 | 1.0298 | −0.0771 | 0.0035 |
| 81 | 0.0205 | −0.1333 | −0.1066 | 1.0236 | −0.0798 | 0.0035 | −0.0001 |
| 80 | −0.1752 | −0.0568 | 1.0163 | −0.0795 | 0.0039 | −0.0001 | 0.0000 |
| 79 | −0.0140 | 1.0089 | −0.1066 | 0.0059 | −0.0005 | 0.0000 | 0.0000 |
| 78 | 1.0019 | −0.0811 | 0.0044 | −0.0001 | 0.0000 | 0.0000 | 0.0000 |

Then, through matrix multiplying the inverse matrix of A of Table 5 with the B matrix, the experimental value (deconvoluted peak height) and an experimental ratio thereof (deconvoluted mole %) of the following Table 6 were derived.

TABLE 6

| | Experimental Value (Deconv. Height) | Experimental Ratio (Deconv. Mole %) |
|---|---|---|
| D0 | 7.47E+02 | 0.0% |
| D1 | −2.64E+03 | 0.0% |
| D2 | 6.55E+03 | 0.1% |
| D3 | −2.02E+03 | 0.0% |
| D4 | −1.49E+04 | 0.0% |
| D5 | 1.77E+05 | 2.5% |
| D6 | 6.98E+06 | 97.4% |

The deconvoluted peak height is a value obtained by correcting mass heights of isotopes included in each of the reference standards, and when comparing the peak height and the height % for each m/z of the deuterium-substituted benzene sample prepared by conducting a deuteration reaction before the deconvolution of Table 4 with the deconvoluted values shown in Table 6, large differences are identified in the values.

Experimental Example 3

Each analysis sample was prepared using benzene-d6 manufactured by each of CIL, Zeochem and Haolv at a concentration of 0.2 μl/ml (sample 2 μl+acetone 10 ml), and was measured by GC-MS under the same condition as in Experimental Example 2.

The deconvoluted values of each of the manufacturers were calculated from the measured values through matrix multiplying the inverse matrix of A of Experimental Example 2 (Table 5), and the peak height for each m/z of benzene-d6 of each of the manufacturers, and the results are shown in the following Table 7.

TABLE 7

| Manufacturer | $D_0$ | $D_1$ | $D_2$ | $D_3$ | $D_4$ | $D_5$ | $D_6$ |
|---|---|---|---|---|---|---|---|
| CIL | 0 | 0 | 0.1 | 0 | 0 | 2.5 | 97.4 |
| Zeochem | 0 | 0 | 0 | 0 | 1.2 | 25.4 | 73.4 |
| Haolv | 0 | 0 | 0 | 0.1 | 3.1 | 27.4 | 69.4 |

In addition, a deuteration reaction of the following Compound 1 was conducted using benzene-d6 of each of the manufacturers having the substitution ratio by the number of deuterium analyzed as above.

[Compound 1]

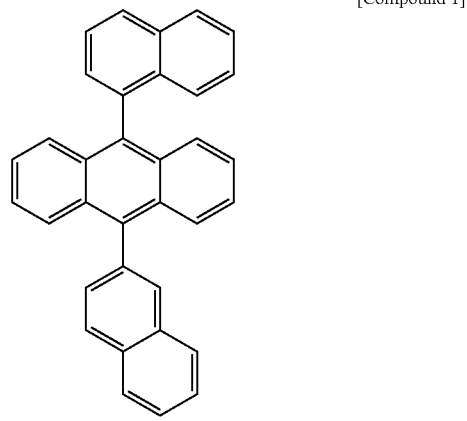

Each of the deuterium-substituted aromatic compounds was obtained, dissolved in tetrahydrofuran (THF) (0.2 mg/mL), and then analyzed by high speed liquid chromatography/mass spectrometry (HPLC/MS) under the following condition.

| | HPLC/UV |
|---|---|
| Mobile phase | A: Acetonitrile/Tetrahydrofuran (constant ratio) |
| | B: Water |
| Run time | 10 min |
| Injection volume | 1~10 μL |
| Detector | PDA detector |
| | HPLC-APCI/MS |
| Capillary | 10~20 kV |
| Cone voltage | 30~70 V |
| Source temperature | 100~150° C. |
| Cone gas flow | 50~200 L/hr |

A percentage of the area for each mass number of the extracted ion chromatogram based on the total area of the total ion chromatogram was matched to the number of deuterium, and the results are shown in Table 8.

In addition, when the lifetime of the device using Compound 1 before deuterium substitution is employed as 100%, the lifetime of the device using each of the deuterium-substituted aromatic compounds was calculated as a percentage, and the results are shown in the device evaluation results of the following Table 8.

The device evaluation herein shows how slowly the luminance of the device manufactured with each of the deuterium-substituted aromatic compounds using the same method decreases as a percentage based on when the lifetime of the device manufactured using the material not substituted with deuterium is employed as 100%.

For example, the result of 138% obtained in the device evaluation result of Zeochem of Table 8 shows the time taken for L/Lo of the device manufactured with the compound having a deuterium substitution reaction conducted with the benzene-d6 of Zeochem using the same method to become 95% as a percentage based on when the time taken for L/Lo of the device manufactured using a material not substituted with deuterium to become 95% is employed as 100%. Herein, Lo is initial luminance, and L is real-time luminance depending on the driving time of the device.

Herein, the device for the lifetime test was manufactured in the following order, and the compounds before/after deuterium substitution were used as a light emitting layer host.

1) Remove residual organic materials in a vacuum chamber.
2) Introduce approximately 1 g of each organic material to deposit to a crucible inside the vacuum chamber, and the vacuum chamber was under vacuum of $10^{-6}$ torr to $10^{-5}$ torr for a day.
3) Introduce an ITO (indium tin oxide) substrate into the vacuum chamber, and the organic material suitable for each layer was deposited while moving the ITO substrate to obtain an organic material layer. Herein, each layer was deposited to a thickness capable of obtaining favorable device efficiency.
4) Deposit Al (cathode) on the organic material layer to manufacture an organic light emitting device.
5) In the vacuum chamber, conduct encapsulation using epoxy, and take out the result from the vacuum chamber.

TABLE 8

| Manufacturer (Benzene-$d_6$) | | CIL | Zeochem | Haolv |
|---|---|---|---|---|
| HPLC Area by the | 14 | — | — | — |
| Number of D | 15 | — | — | — |
| Substitution | 16 | 5.1% | 5.0% | — |
| | 17 | 10.0% | 9.0% | 13.7% |
| | 18 | 17.5% | 13.0% | 15.3% |
| | 19 | 23.6% | 27.3% | 21.3% |
| | 20 | 18.1% | 18.3% | 22.2% |
| | 21 | 16.9% | 19.1% | 18.0% |
| | 22 | 8.8% | 8.3% | 9.5% |
| Total Substitution Ratio (%) | | 87.5 | 88.0 | 88.4 |
| Device Evaluation Result | | 142% to 150% | 138% | 138% |

Although the average substitution ratios of the deuterium-substituted benzene of the three manufacturers of Table 8 were similar to each other, it was identified that there was a difference in the performance depending on the content and the distribution of benzene-d0 to benzene-d5 components that may be considered as impurities.

Accordingly, it was identified that there is a need to analyze an absolute content of the components having the number of deuterium of 6 by analyzing the substitution ratio by the number of deuterium of the prepared benzene-d6 rather than the average deuterium substitution ratio of the benzene-d6.

The invention claimed is:
1. A method for analyzing deuterated benzene, the method comprising:
step (1) separating deuterated benzene by gas chromatography, and then deriving a peak height for each of 78 m/z to 84 m/z of the deuterated benzene based on an individual mass chromatogram of an isotope having a different mass number obtained by a mass analysis;

step (2) separating each of a benzene-d0 reference standard, a benzene-d1 reference standard, a benzene-d2 reference standard, a benzene-d3 reference standard, a benzene-d4 reference standard, a benzene-d5 reference standard and a benzene-d6 reference standard by gas chromatography, and then calculating a peak height for each of 78 m/z to 84 m/z of each of the benzene-d0 to benzene-d6 reference standards based on an individual mass chromatogram of an isotope having a different mass number obtained by a mass analysis;

step (3) calculating an inverse matrix of a value obtained by normalizing the peak height for each of 78 m/z to 84 m/z of each of the benzene-d0 to benzene-d6 reference standards; and step (4) calculating a value obtained by deconvoluting the peak height for each of 78 m/z to 84 m/z of the deuterated benzene through the following Equation 1:

$$\text{Deconvoluted peak height}(i) = Ki(\text{benzene-}d0) \times H(84m/z) + Ki(\text{benzene-}d1) \times H(83m/z) + Ki(\text{benzene-}d2) \times H(82m/z) + Ki(\text{benzene-}d3) \times H(81m/z) + Ki(\text{benzene-}d4) \times H(80m/z) + Ki(\text{benzene-}d5) \times H(79m/z) + Ki(\text{benzene-}d6) \times H(78m/z) \quad \text{[Equation 1]}$$

in Equation 1, i means 78 m/z, 79 m/z, 80 m/z, 81 m/z, 82 m/z, 83 m/z or 84 m/z;

K means an inverse matrix value for each of 78 m/z to 84 m/z of each of the benzene-do reference standard, the benzene-d1 reference standard, the benzene-d2 reference standard, the benzene-d3 reference standard, the benzene-d4 reference standard, the benzene-d5 reference standard and the benzene-d6 reference standard calculated in step (3); and H means the peak height for each of 78 m/z to 84 m/z of the deuterated benzene derived in step (1).

2. The method for analyzing deuterated benzene of claim 1, the method further comprising step (5) calculating a percentage for each of 78 m/z to 84 m/z of the values obtained by deconvoluting the peak height for each of 78 m/z to 84 m/z of the deuterated benzene.

3. The method for analyzing deuterated benzene of claim 2, the method further comprising step (6) selecting the deuterated benzene in which the percentage for 84 m/z of the value obtained by deconvoluting the peak height for 84 m/z calculated in step (5) is 40% or greater.

4. The method for analyzing deuterated benzene of claim 2, the method further comprising step (7) calculating an average deuterium substitution ratio through the following Equation 2:

$$\text{Average deuterium substitution ratio (\%)} = \{A0(78m/z) \times B0(78m/z) + (A1(79m/z) \times B1(79m/z)) + (A2(80m/z) \times B2(80m/z)) + (A3(81m/z) \times B3(81m/z)) + (A4(82m/z) \times B4(82m/z)) + (A5(83m/z) \times B5(83m/z)) + (A6(84m/z) \times B6(84m/z))\}/6 \quad \text{[Equation 2]}$$

in Equation 2,

A0 to A6 are percentages of the values respectively obtained by deconvoluting the peak height for 78 m/z, 79 m/z, 80 m/z, 81 m/z, 82 m/z, 83 m/z and 84 m/z, respectively; and B0 to B6 are the number of deuterium substitution of the deuterated benzene corresponding to 78 m/z, 79 m/z, 80 m/z, 81 m/z, 82 m/z, 83 m/z and 84 m/z, respectively.

5. A method for selecting deuterated benzene for preparing a deuterated compound, the method comprising:

analyzing deuterated benzene using the method of claim 1 to calculate the value obtained by deconvoluting the peak height for each of 78 m/z to 84 m/z of the deuterated benzene; and selecting the deuterated benzene when, based on a sum of the values obtained by deconvoluting the peak height for each of 78 m/z to 84 m/z, a percentage of the value obtained by deconvoluting the peak height for 84 m/z is greater than or equal to a reference value.

6. The method for selecting deuterated benzene for preparing a deuterated compound according to claim 5, wherein the reference value is 40% or greater.

7. A method for preparing a deuterated compound, the method comprising:

analyzing deuterated benzene using the method of claim 1 to calculate the value obtained by deconvoluting a peak height for each of 78 m/z to 84 m/z of the deuterated benzene;

selecting the deuterated benzene when, based on a sum of the values obtained by deconvoluting a peak height for each of 78 m/z to 84 m/z, a percentage of the value obtained by deconvoluting the peak height for 84 m/z is greater than or equal to a reference value; and deuterating an aromatic compound by using the selected deuterated benzene as a deuterium source.

8. The method for preparing a deuterated compound according to claim 7, wherein the reference value is 40% or greater.

* * * * *